(12) United States Patent
Fujiwara

(10) Patent No.: US 11,942,031 B2
(45) Date of Patent: Mar. 26, 2024

(54) CURRENT LIMITING CIRCUIT, DISPLAY DEVICE, AND CURRENT LIMITING METHOD

(71) Applicant: JOLED INC., Tokyo (JP)

(72) Inventor: Manabu Fujiwara, Tokyo (JP)

(73) Assignee: JOLED INC., Tokyo (JP)

( * ) Notice: Subject to any disclaimer, the term of this patent is extended or adjusted under 35 U.S.C. 154(b) by 0 days.

(21) Appl. No.: 17/989,386

(22) Filed: Nov. 17, 2022

(65) Prior Publication Data

US 2023/0237962 A1 Jul. 27, 2023

(30) Foreign Application Priority Data

Jan. 26, 2022 (JP) ................................. 2022-010054

(51) Int. Cl.
*G09G 3/3208* (2016.01)

(52) U.S. Cl.
CPC ... *G09G 3/3208* (2013.01); *G09G 2310/0286* (2013.01); *G09G 2330/021* (2013.01); *G09G 2330/025* (2013.01)

(58) Field of Classification Search
CPC ......... G09G 3/3208; G09G 2310/0286; G09G 2330/021; G09G 2330/025
See application file for complete search history.

(56) References Cited

U.S. PATENT DOCUMENTS

| 2008/0174605 A1* | 7/2008 | Kiuchi | H04N 5/20 345/531 |
| 2020/0279528 A1* | 9/2020 | Kato | H04N 25/705 |
| 2021/0090499 A1* | 3/2021 | Kato | G09G 3/3233 |

FOREIGN PATENT DOCUMENTS

| JP | 2007-212644 | | 8/2007 | |
| WO | WO-03065588 A1 * | | 8/2003 | H03M 1/1028 |

* cited by examiner

*Primary Examiner* — Stephen G Sherman
(74) *Attorney, Agent, or Firm* — GREENBLUM & BERNSTEIN, P.L.C.

(57) ABSTRACT

A current limiting circuit is a circuit that receives a video signal for a display panel including pixels, and limits current consumption of the pixels. The current limiting circuit includes: a first gain calculation circuit that calculates a first gain for multiplying with the video signal, based on first power consumption that is power consumption of the pixels corresponding to the video signal; a second gain calculation circuit that calculates a second gain for multiplying with the video signal, based on the first power consumption and a rate of change of the first power consumption; a gain selection circuit that selects one of the first gain and the second gain as a gain by which the video signal is to be multiplied; and a gain multiplication circuit that multiplies the video signal by the gain.

13 Claims, 14 Drawing Sheets

CURRENT LIMITING CIRCUIT, DISPLAY DEVICE, AND CURRENT LIMITING METHOD

CROSS REFERENCE TO RELATED APPLICATION

The present application is based on and claims priority of Japanese Patent Application No. 2022-010054 filed on Jan. 26, 2022. The entire disclosure of the above-identified application, including the specification, drawings and claims is incorporated herein by reference in its entirety.

FIELD

The present disclosure relates to a current limiting circuit, a display device, and a current limiting method.

BACKGROUND

Conventionally, display devices, such as organic electroluminescent (EL) display devices in which each pixel has a self-luminous element have been developed. With such display devices, increase in the size of the display panel is desired. An increase in the size of the display panel causes an increase in electric power consumed by the display device. In view of this, there is a technique for reducing power consumption of a display device (see Patent Literature 1 (PTL 1)). In the display device disclosed in PTL 1, the power consumption of the display panel is reduced by calculating power consumption of the display panel for each horizontal period (horizontal synchronization period) based on a video signal, and, based on the calculation result, limiting a current to be supplied to each pixel of the display panel. In this way, the display device disclosed in PTL 1 attempts to reduce the power consumption of the display panel to a control target power value or less.

CITATION LIST

Patent Literature

PTL 1: Japanese Unexamined Patent Application Publication No. 2007-212644

SUMMARY

Technical Problem

However, with the display device disclosed in PTL 1, when a luminance represented by a video signal abruptly increases as in the case of, for example, switching from all-black display to all-white display, the power consumption of the display panel may exceed the control target power value by a large margin.

The present disclosure has been conceived in view of the above circumstances, and has an object to provide a current limiting circuit and so on capable of reducing power consumption of the display panel even when the luminance represented by a video signal abruptly increases.

Solution to Problem

In order to achieve the above object, a current limiting circuit according to one aspect of the present disclosure is a current limiting circuit that receives a video signal for a display panel including pixels, and limits current consumption of the pixels, the current limiting circuit including: a first gain calculation circuit that calculates a first gain for multiplying with the video signal, based on first power consumption that is power consumption of the pixels corresponding to the video signal; a second gain calculation circuit that calculates a second gain for multiplying with the video signal, based on the first power consumption and a rate of change of the first power consumption; a gain selection circuit that selects one of the first gain and the second gain as a gain by which the video signal is to be multiplied; and a gain multiplication circuit that multiplies the video signal by the gain.

In order to achieve the above object, a display device according to one aspect of the present disclosure includes the current limiting circuit and the display panel.

In order to achieve the above object, a current limiting method according to one aspect of the present disclosure is a current limiting method for limiting current consumption of pixels included in a display panel, the current limiting method including: calculating a first gain for multiplying with a video signal for the display panel, based on first power consumption that is power consumption of the pixels corresponding to the video signal; calculating a second gain for multiplying with the video signal, based on the first power consumption and a rate of change of the first power consumption; selecting one of the first gain and the second gain as a gain by which the video signal is to be multiplied; and multiplying the video signal by the gain.

Advantageous Effects

According to the present disclosure, it is possible to provide a current limiting circuit and so on capable of reducing power consumption of a display panel even when the luminance represented by a video signal abruptly increases.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
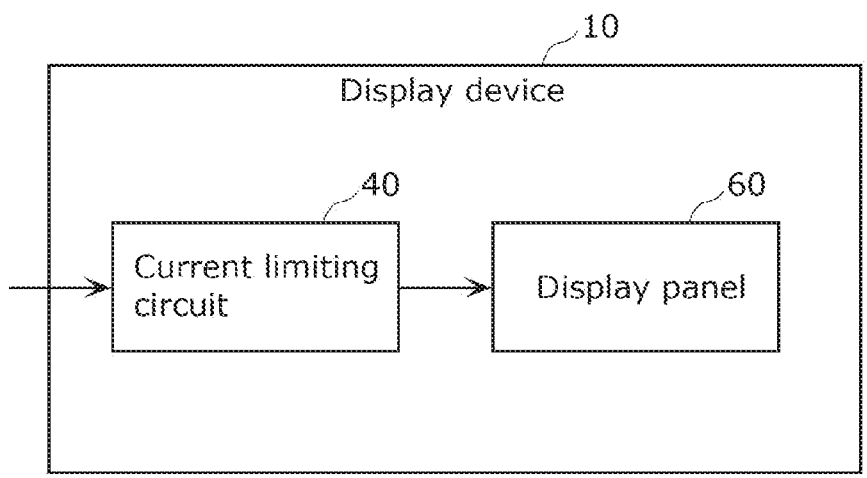
FIG. 1 is a block diagram illustrating a configuration of a display device according to an embodiment.

Hereinafter, an exemplary embodiment of the present disclosure is described with reference to the drawings. Note that the embodiment described below shows a specific example of the present disclosure. Therefore, the numerical values, shapes, materials, constituent elements, the arrangement and connection of the constituent elements, steps, the processing order of the steps etc. illustrated in the following embodiment are mere examples, and are not intended to limit the present disclosure.

Note that the drawings are represented schematically, and are not necessarily precise illustrations. Also, in the drawings, essentially the same constituent elements are given the same reference signs, and overlapping descriptions thereof are omitted or simplified.

Embodiment

A current limiting circuit, a display device, and a current limiting method according to an embodiment are described.

1. Overall Configuration of Display Device

An overall configuration of the display device according to the present embodiment is described with reference to FIG. 1 through FIG. 5.

Figure 2:
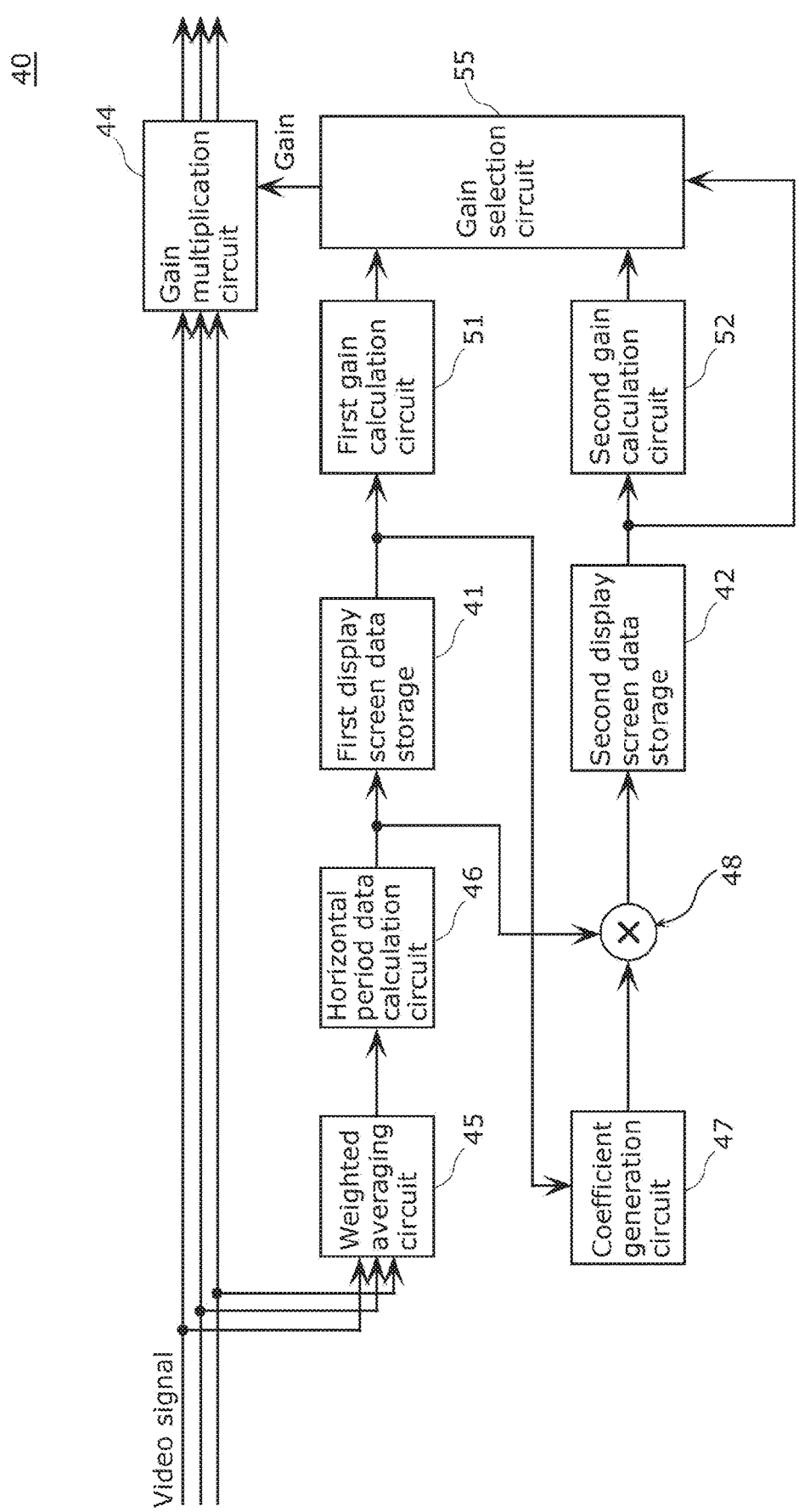
FIG. 2 is a block diagram illustrating a functional configuration of a current limiting circuit according to the embodiment.
Figure 3:
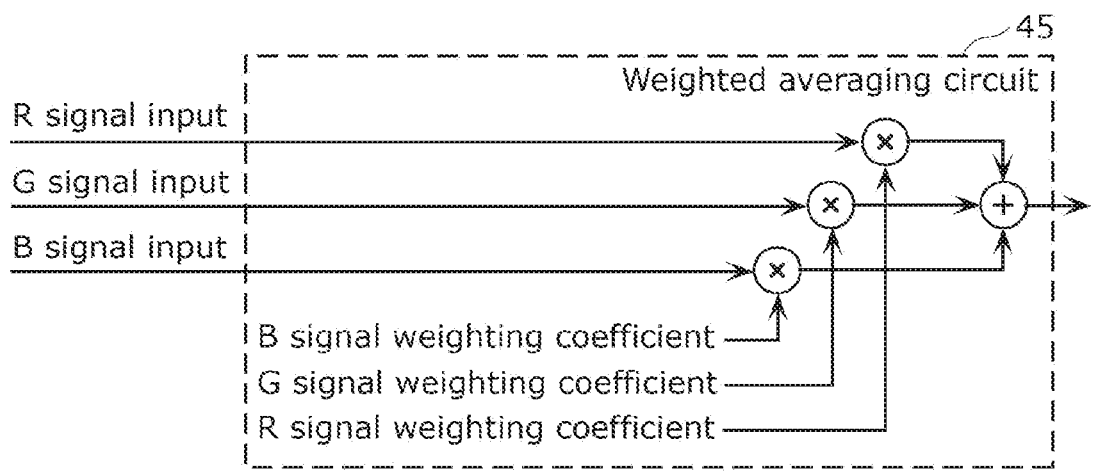
FIG. 3 is a block diagram illustrating a functional configuration of a weighted averaging circuit included in the current limiting circuit according to the embodiment.
Figure 4:
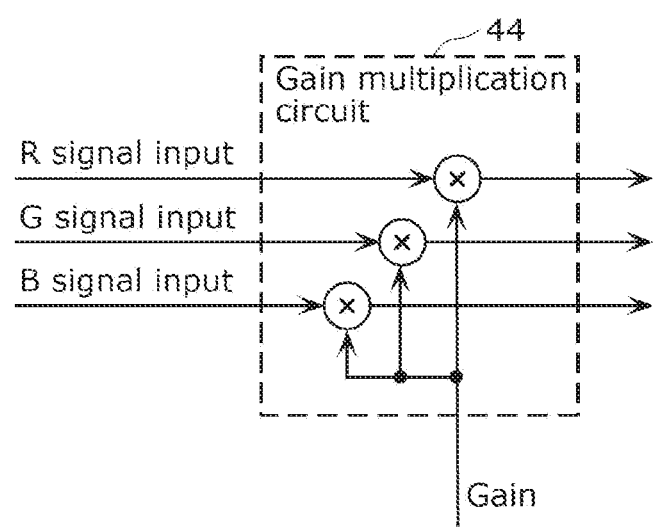
FIG. 4 is a block diagram illustrating a functional configuration of a gain multiplication circuit included in the current limiting circuit according to the embodiment.
Figure 5:
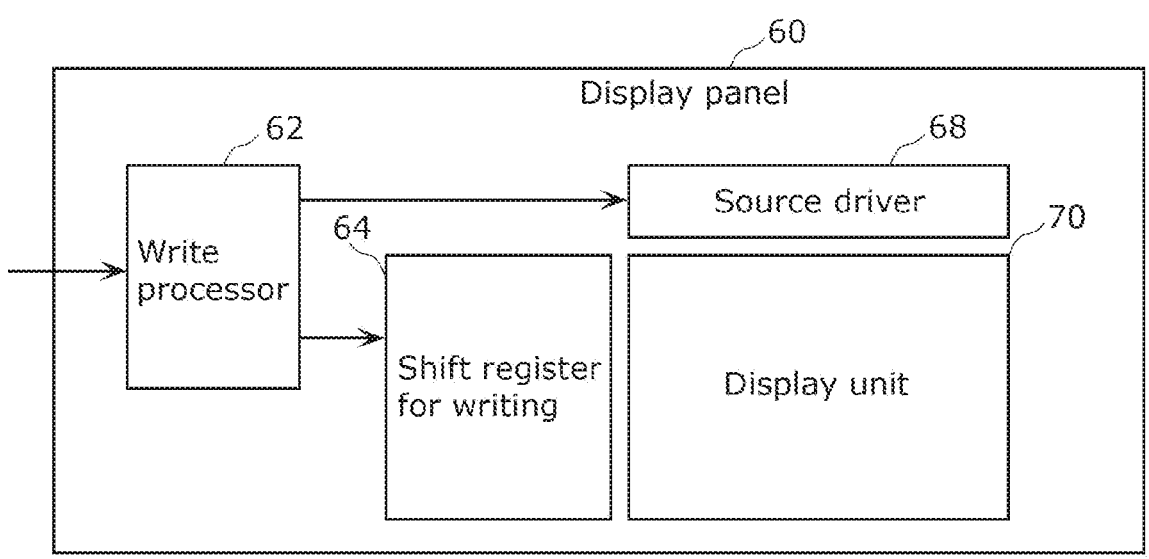
FIG. 5 is a block diagram illustrating a functional configuration of a display panel included in the display device according to the embodiment.

FIG. 1 is a block diagram illustrating a configuration of display device 10 according to the present embodiment. FIG. 2 is a block diagram illustrating a functional configuration of current limiting circuit 40 according to the present embodiment. FIG. 3 and FIG. 4 are block diagrams illustrating functional configurations of weighted averaging circuit 45 and gain multiplication circuit 44, respectively, which are included in current limiting circuit 40 according to the present embodiment. FIG. 5 is a block diagram illustrating a functional configuration of display panel 60 included in display device 10 according to the present embodiment.

As illustrated in FIG. 1, display device 10 includes current limiting circuit 40 and display panel 60.

Display panel 60 is a panel which includes pixels each having a self luminous element, and which displays an image corresponding to a video signal. As illustrated in FIG. 5, display panel 60 includes display unit 70, write processor 62, source driver 68, and shift register for writing 64. Display unit 70 includes pixels arranged in a matrix, and displays an image corresponding to a video signal. Write processor 62 outputs a data signal and a control signal for writing display data to display unit 70. Write processor 62 is a circuit included in a timing-controller (TCON) chip. Source driver 68 outputs the data signal to display unit 70. Shift register for writing 64 outputs, to display unit 70, a write signal which is a control signal for writing the data signal to display unit 70.

Current limiting circuit 40 is a circuit that receives a video signal for display panel 60 including pixels, and reduces the power consumption of display panel 60 by limiting current consumption of the pixels. In the present embodiment, current limiting circuit 40 limits a current to be supplied to the pixels to inhibit a power value supplied to the pixels corresponding to power consumption of display panel 60 from exceeding a control target power value. The control target power value is a control target upper limit of power consumption of the pixels. Current limiting circuit 40 limits current consumption of the pixels by reducing pixel values of the video signal by multiplying pixel values included in the video signal by a gain that is less than or equal to 1, and outputting a video signal including the reduced pixel values to display panel 60. As illustrated in FIG. 2, current limiting circuit 40 includes weighted averaging circuit 45, horizontal period data calculation circuit 46, first display screen data storage 41, second display screen data storage 42, coefficient generation circuit 47, multiplication circuit 48, first gain calculation circuit 51, second gain calculation circuit 52, gain selection circuit 55, and gain multiplication circuit 44.

Current limiting circuit 40 is implemented as, for example, an integrated circuit. Current limiting circuit 40 may be integrated as a part of a TCON chip together with write processor 62 and so on included in display panel 60, or may be a separate integrated circuit. Further, the form of integration of current limiting circuit 40 is not limited to these forms. Note that current limiting circuit 40 may be implemented using an electric circuit or the like other than an integrated circuit.

Weighted averaging circuit 45 is a circuit which calculates a weighted average of pixel values included in a video signal. In the present embodiment, the video signal includes a red (R) signal, a green (G) signal, and a blue (B) signal. As illustrated in FIG. 3, weighted averaging circuit 45 multiplies display data of each of an R signal, a G signal, and a B signal by weighting coefficients (R signal weighting coefficient, G signal weighting coefficient, and B signal weighting coefficient) according to power consumption characteristics of the respective R, G, and B pixels of display unit 70, and calculates the sum of these multiplication results.

Horizontal period data calculation circuit 46 calculates horizontal period power conversion data corresponding to display data for each horizontal period. In the present embodiment, horizontal period data calculation circuit 46 calculates an integrated value or an average value of weighted averages output by weighted averaging circuit 45 in the horizontal period as horizontal period power conversion data (level integrated value).

First display screen data storage 41 is a storage which stores power conversion data for at least one frame. In the present embodiment, first display screen data storage 41 receives power conversion data output by horizontal period data calculation circuit 46, and first display screen data storage 41 stores power conversion data for one frame.

First gain calculation circuit 51 is a circuit which calculates a first gain for multiplying with the video signal, based on first power consumption that is power consumption of the pixels corresponding to a video signal. The first power consumption is power which is consumed by the pixels when a video signal is input to display panel 60. First gain calculation circuit 51 outputs the calculated first gain to gain selection circuit 55.

First gain calculation circuit 51 calculates a first gain for multiplying with the video signal, based on power conversion data stored in first display screen data storage 41 and a control target power value. In the present embodiment, first gain calculation circuit 51 calculates a first display screen power value that is a prediction value of power consumption of the pixels corresponding to a video signal for one frame, based on the power conversion data stored in first display screen data storage 41. The first display screen power value is one example of the first power consumption. First gain calculation circuit 51 calculates a sum of horizontal period power conversion data for each of the horizontal lines stored in first display screen data storage 41 as the first display screen power value.

The first gain calculated by first gain calculation circuit 51 is less than 1 when the first display screen power value is greater than a control target power value. More specifically, when the first display screen power value is greater than the control target power value, the first gain calculated by first gain calculation circuit 51 is less than or equal to a value obtained by dividing the control target power value by the first display screen power value. In the present embodiment, when the first display screen power value is greater than the control target power value, the first gain is a value obtained by dividing the control target power value by the first display screen power value. When the first display screen power value is not greater than the control target power value, first gain calculation circuit 51 sets the first gain to 1. In the present embodiment, when the first display screen power value is greater than the control target power value, first gain calculation circuit 51 calculates the first gain by dividing the control target power value by the first display screen power value.

First gain calculation circuit 51 calculates and outputs the first gain for each period shorter than a vertical period of the video signal. In the present embodiment, first gain calculation circuit 51 calculates and outputs the first gain for each horizontal period.

Note that a method for setting the first gain is not limited to the foregoing method. For example, first gain calculation circuit 51 may have a look-up table showing a relationship between the first gain and a value corresponding to the first display screen power value, and may set the first gain corresponding to the first display screen power value based on the look-up table.

Coefficient generation circuit 47 is a circuit which generates a sensitivity coefficient. The sensitivity coefficient is a coefficient that increases with an increase in the rate of change of the first power consumption. In the present embodiment, sensitivity coefficient Cs is represented by Expression (1) below using sensitivity level Iv, frame average picture level apl, rate of change dl, and coefficient of change diff.

$$Cs = 1 + lv \times dl \times \text{diff} \times apl \quad (1)$$

Here, sensitivity level lv is a coefficient for adjusting the sensitivity of current limiting performed by current limiting circuit 40 with respect to sensitivity coefficient Cs, and for example is set to a value that is greater than 0 and is equal to or less than 16.

Frame average picture level apl is a value corresponding to the average value of the gradations of an image displayed in one frame. In the present embodiment, the ratio of the first display screen power value to an upper limit value of the first display screen power value is used as the frame average picture level. The term "upper limit value of the first display screen power value" refers to the first display screen power value in a case where each of the pixels is set to maximum luminance (that is, in the case of all-white display). Frame average picture level apl is one example of a value corresponding to the first power consumption.

Rate of change dl is a rate of change over time of frame average picture level apl. Rate of change dl is a ratio of the amount of change in frame average picture level apl for each period shorter than a vertical period with respect to an upper limit value of frame average picture level apl. The term "upper limit value of the frame average picture level" refers to the frame average picture level in a case where each of the pixels is set to maximum luminance (that is, in the case of all-white display). Rate of change dl is a value that is greater than or equal to −1 and less than or equal to 1. In the present embodiment, rate of change dl is calculated for each horizontal period.

Coefficient of change diff is a coefficient which adjusts an influence ratio with respect to sensitivity coefficient Cs of rate of change dl, and for example is set to a value that is greater than or equal to 0 and less than or equal to 1. In the present embodiment, when rate of change dl is 0 or less, that is, in a case where frame average picture level apl is not increasing, coefficient of change diff is set to 0. In this case, sensitivity coefficient Cs is 1.

As represented by the aforementioned Expression (1), sensitivity coefficient Cs is a coefficient that increases as rate of change dl of frame average picture level apl (that is, the rate of change of the first power consumption) increases. Note that the expression that represents sensitivity coefficient Cs is not limited to Expression (1). For example, coefficient of change diff and sensitivity level lv may be combined as one coefficient. Further, a coefficient for adjusting the influence ratio of frame average picture level apl with respect to sensitivity coefficient Cs may be multiplied by frame average picture level apl of Expression (1).

Multiplication circuit 48 is a circuit which multiplies power conversion data by a sensitivity coefficient. Multiplication circuit 48 multiplies horizontal period power conversion data that is output from horizontal period data calculation circuit 46 by the sensitivity coefficient output from coefficient generation circuit 47, and outputs the product obtained by the multiplication to second display screen data storage 42.

Second display screen data storage 42 is a storage which stores a value obtained by multiplying power conversion data by a sensitivity coefficient. In the present embodiment, second display screen data storage 42 stores converted data obtained by multiplying each horizontal period power conversion data for one frame by a sensitivity coefficient which is generated immediately after each horizontal period power conversion data is stored in first display screen data storage 41.

Second gain calculation circuit 52 is a circuit that calculates a second gain for multiplying with the video signal, based on the first power consumption that is power consumption of pixels corresponding to the video signal and a rate of change of the first power consumption. In the present embodiment, second gain calculation circuit 52 calculates the second gain based on second power consumption. Here, the term "second power consumption" refers to power consumption by pixels corresponding to a value obtained when a video signal is multiplied by a sensitivity coefficient generated by coefficient generation circuit 47. That is, the second power consumption is power which is consumed by the pixels when a signal obtained by multiplying the video signal by the sensitivity coefficient is input to display panel 60. Second gain calculation circuit 52 outputs the calculated second gain to gain selection circuit 55. As mentioned above, the sensitivity coefficient that is used for calculating the second power consumption is a coefficient that depends on frame average picture level apl corresponding to the first power consumption, and rate of change dl of frame average picture level apl. Therefore, the second power consumption is a value which is determined based on the first power consumption and the rate of change of the first power consumption. Thus, in the present embodiment, by calculating the second gain based on the second power consumption, second gain calculation circuit 52 is calculating the second gain based on the first power consumption and the rate of change of the first power consumption.

Second gain calculation circuit 52 calculates a second gain for multiplying with the video signal, based on conversion data stored in second display screen data storage 42 and a control target power value. In the present embodiment, second gain calculation circuit 52 calculates, based on conversion data stored in second display screen data storage 42, a second display screen power value that is a prediction value of power consumption of the pixels corresponding to a value obtained by multiplying a video signal for one frame by a sensitivity coefficient. The second display screen power value is one example of the second power consumption, and is determined based on the first power consumption and the rate of change in the first power consumption. Second gain calculation circuit 52 calculates a sum of converted data for each of the horizontal lines stored in second display screen data storage 42 as the second display screen power value.

The second gain calculated by second gain calculation circuit 52 is less than 1 when the second display screen power value is greater than a control target power value. More specifically, when the second display screen power value is greater than the control target power value, the second gain calculated by second gain calculation circuit 52 is less than or equal to a value obtained by dividing the control target power value by the second display screen power value. In the present embodiment, when the second display screen power value is greater than the control target power value, the second gain is a value obtained by dividing the control target power value by the second display screen power value. When the second display screen power value is not greater than the control target power value, second gain calculation circuit 52 sets the second gain to 1. In the present embodiment, when the second display screen power value is greater than the control target power value, second gain calculation circuit 52 calculates the second gain by dividing the control target power value by the second display screen power value.

Second gain calculation circuit 52 calculates and outputs the second gain for each period shorter than a vertical period of the video signal. In the present embodiment, second gain calculation circuit 52 calculates and outputs the second gain for each horizontal period.

Note that a method for setting the second gain is not limited to the foregoing method. For example, second gain calculation circuit 52 may have a look-up table showing a relationship between the second gain and a value corresponding to the second display screen power value, and may set the second gain corresponding to the second display screen power value based on the look-up table.

Gain selection circuit 55 is a circuit that selects one of the first gain and the second gain as a gain by which the video signal is to be multiplied. Gain selection circuit 55 receives the first gain and the second gain from first gain calculation circuit 51 and second gain calculation circuit 52, respectively. In the present embodiment, gain selection circuit 55 selects the first gain as the gain when the first power consumption is decreasing (that is, when the first power consumption decreases over time), and selects the second gain as the gain when the first power consumption is increasing (that is, when the first power consumption increases over time). Note that gain selection circuit 55 selects, as the gain, the most recently selected one of the first gain and the second gain, when the first power consumption has not changed (that is, when the first power consumption is constant with respect to time). Gain selection circuit 55 selects the first gain as the gain when a change over time of the first power consumption cannot be determined; for example, immediately after current limiting circuit 40 has started receiving the video signal.

In the present embodiment, converted data accumulated in second display screen data storage 42 is used for determining a change over time of the first power consumption. Gain selection circuit 55 calculates the sum of converted data for each of the horizontal lines stored in second display screen data storage 42 as the second display screen power value, and selects the first gain or the second gain based on an increase or a decrease in the second display screen power value. An increase or a decrease in the second display screen power value corresponds to an increase or a decrease in the first power consumption, respectively.

Note that, in gain selection circuit 55, information other than converted data accumulated in second display screen data storage 42 may be used to determine a change over time of the first power consumption. For example, power conversion data accumulated in first display screen data storage 41 may be used.

Gain multiplication circuit 44 is a circuit which multiplies a video signal by a gain. Gain multiplication circuit 44 multiplies the video signal by the gain selected by gain selection circuit 55. In the present embodiment, as illustrated in FIG. 4, each of the R, G, and B signals included in the video signal is multiplied by the gain. In this way, when the display screen power value is greater than the control target power value, since the video signal is multiplied by a gain that is less than 1, the luminance of the video signal can be reduced. Accordingly, a current to be supplied to the pixels of display panel 60 is limited.

Figure 6:
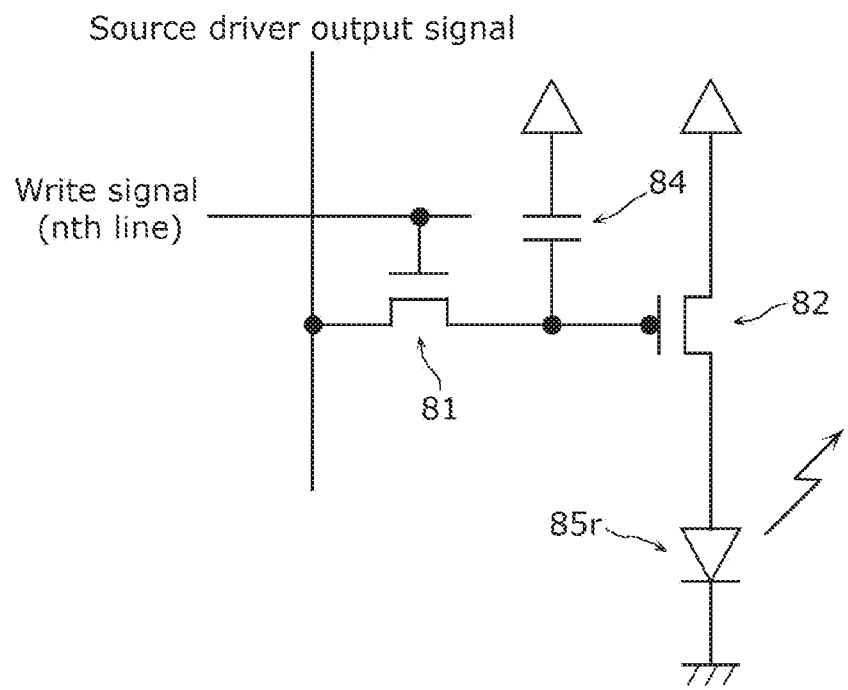
FIG. 6 is a circuit diagram illustrating one example of a configuration of a sub-pixel included in a pixel according to the embodiment.

The pixels included in display panel 60 are described with reference to FIG. 6. FIG. 6 is a circuit diagram illustrating one example of a configuration of a sub-pixel included in a pixel according to the present embodiment. FIG. 6 illustrates a sub-pixel which includes an organic EL element as a self luminous element. Each pixel according to the present embodiment includes three sub-pixels each corresponding to a different one of three colors of R, G, and B. The sub-pixel illustrated in FIG. 6 is a sub-pixel for emitting red (R) light. Note that a sub-pixel for emitting green light and a sub-pixel for emitting blue light have the same circuit configurations as that of the circuit illustrated in FIG. 6.

As illustrated in FIG. 6, the sub-pixel includes thin-film transistor (TFT) 81, capacitor 84, TFT 82, and self luminous element 85r.

TFT 81 has one end to which a data signal that is an output signal of source driver 68 is input. Capacitor 84 is connected to TFT 81. TFT 82 has a control terminal connected to a connection point between TFT 81 and capacitor 84. Self luminous element 85r is connected to TFT 82.

TFT 81 switches ON and OFF based on a write signal which is a control signal output by shift register for writing 64. When TFT 81 is switched ON by a write signal in one horizontal period, capacitor 84 holds a data signal which is a source driver output signal corresponding to the signal level to be written to a pixel.

After the write signal is switched OFF, a current corresponding to a voltage held in capacitor 84 flows to TFT 82, and self luminous element 85r lights up.

2. Operations of Current Limiting Circuit and Current Limiting Method

Operations of current limiting circuit 40 and a current limiting method are described.

Figure 7:
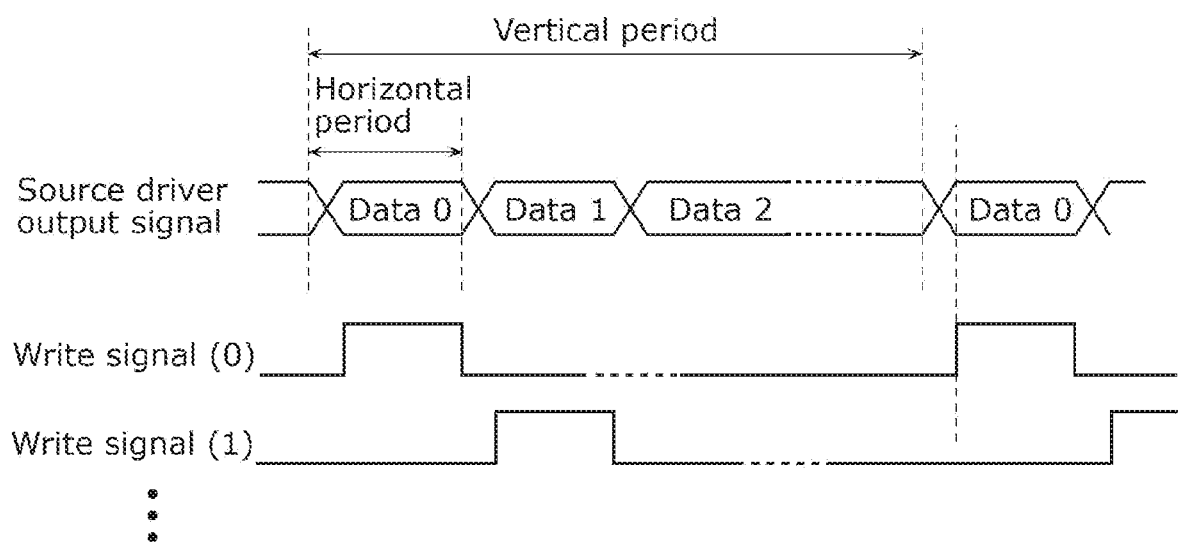
FIG. 7 is a diagram illustrating one example of a write signal to be input to a sub-pixel according to the embodiment.

First, prior to describing operations of current limiting circuit 40 and so on, a signal to be input to the sub-pixel illustrated in FIG. 6 is described with reference to FIG. 7. FIG. 7 is a diagram illustrating one example of a write signal to be input to the sub-pixel according to the present embodiment. Display device 10 writes, to display unit 70 by means of a write signal, a data signal which is output by source driver 68 for each horizontal period, and emits light in units of horizontal lines (hereinafter, also simply referred to as "lines"). Display device 10 repeats such operations for each vertical period.

Figure 8:
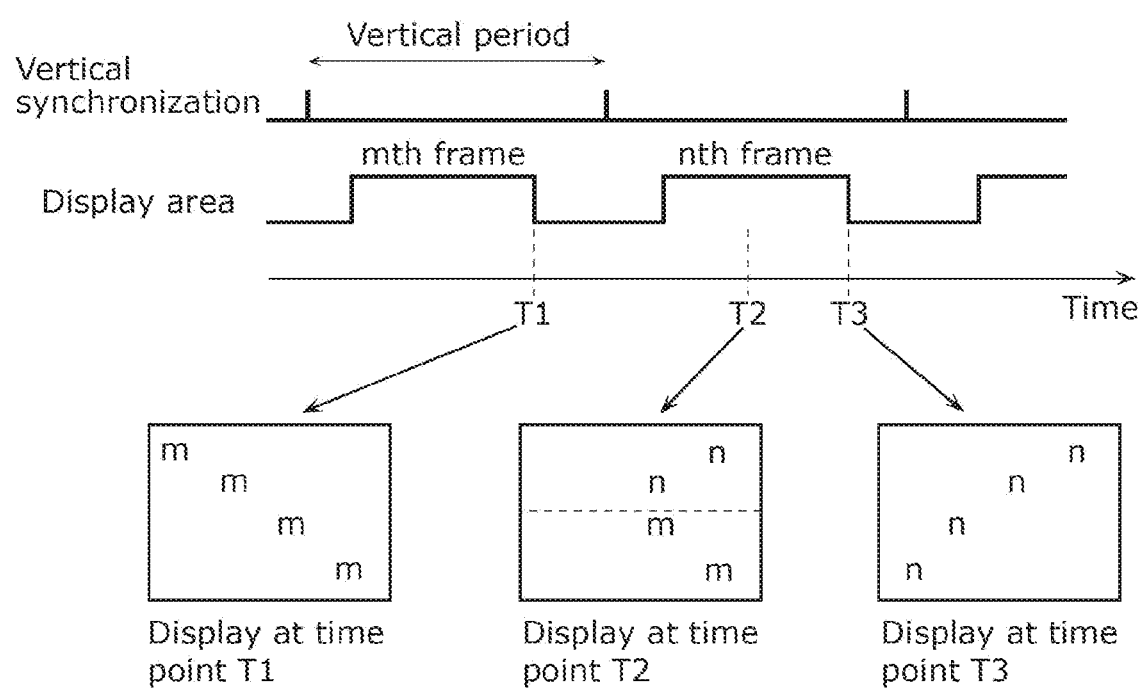
FIG. 8 is a schematic diagram illustrating transitions of the display state of a display unit according to the embodiment.

Next, transitions of the display state of display unit 70 are described with reference to FIG. 8. FIG. 8 is a schematic diagram illustrating transitions of the display state of display unit 70 according to the present embodiment. In FIG. 8, what is displayed on the display screen changes from the display at time point T1 to the display at time point T2, and from the display at time point T2 to the display at time point T3. A display screen of an mth frame is displayed at time point T1 corresponding to the end of the mth frame illustrated in FIG. 8. Here, shift register for writing 64 that outputs a write signal which is a control signal for writing a data signal to each pixel outputs a write signal so that scanning is performed from the top to the bottom of the display screen starting at the beginning of the display area of display unit 70. For this reason, at time point T2 corresponding to the middle of an nth frame following the mth frame (that is, the nth frame is an (m+1)th frame), the upper half of the display screen changes to the nth frame, and the lower half does not change from the mth frame. At time point T3 corresponding to the end of the nth frame, the bottom of the display area is scanned and the entire display screen shows the nth frame.

Figure 9:
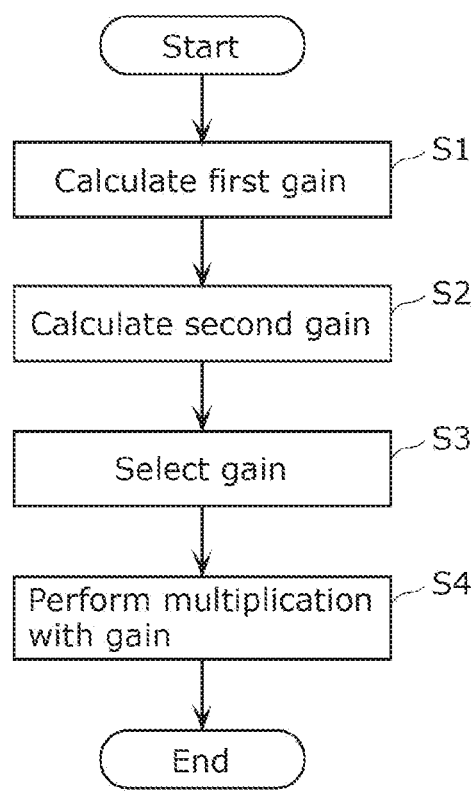
FIG. 9 is a flow chart illustrating a current limiting method according to the embodiment.

Next, operations of current limiting circuit 40 and a current limiting method according to the present embodiment are described with reference to FIG. 9. FIG. 9 is a flow chart illustrating a current limiting method according to the present embodiment.

As illustrated in FIG. 9, first, first gain calculation circuit 51 of current limiting circuit 40 calculates a first gain for multiplying a video signal by based on a first power consumption that is the power consumption by pixels corresponding to a video signal for display panel 60 (S1: calculating of a first gain). The calculating of the first gain (S1) is described below.

Figure 10:
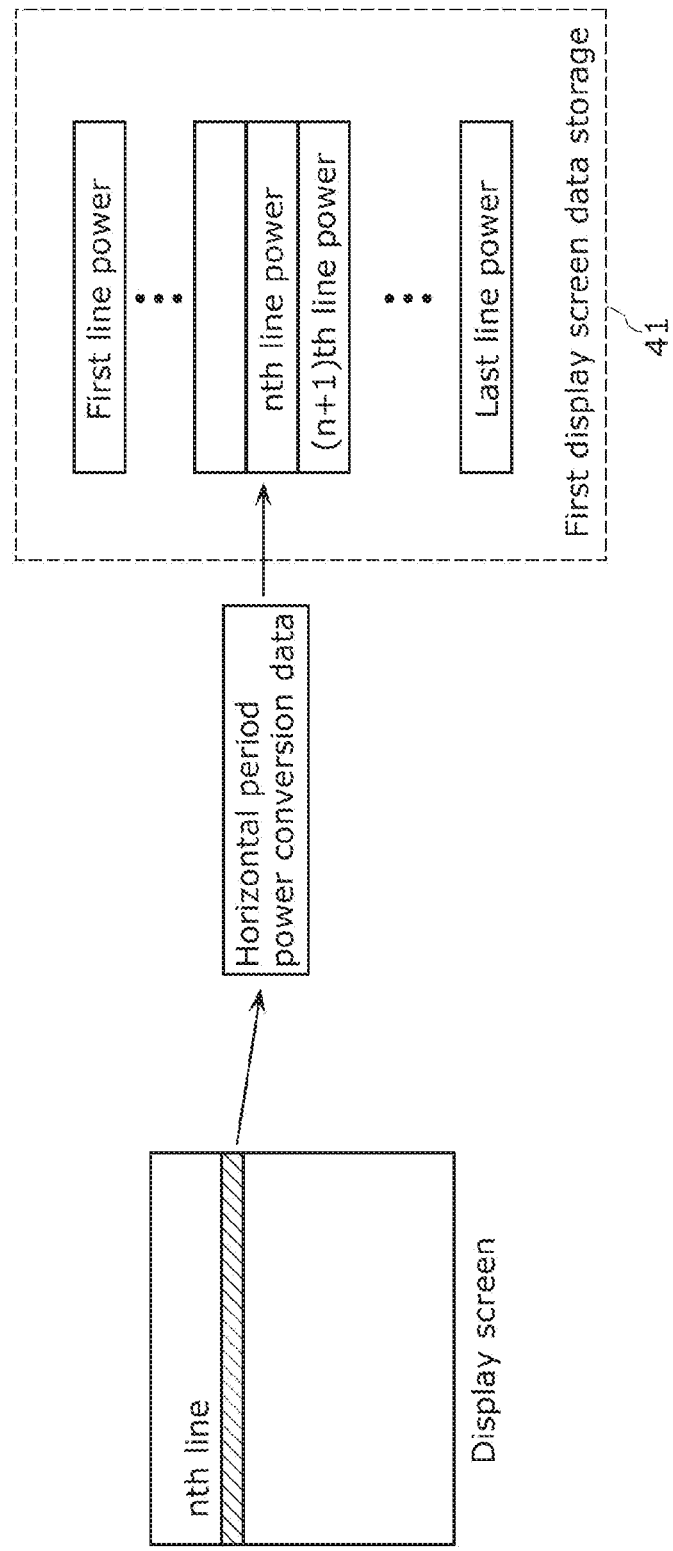
FIG. 10 is a schematic diagram illustrating a configuration of a first display screen data storage according to the embodiment.

First gain calculation circuit 51 uses power conversion data for calculating the first gain. The configuration of first display screen data storage 41 that stores the power conversion data is described with reference to FIG. 10. FIG. 10 is a schematic diagram illustrating the configuration of first display screen data storage 41 according to the present embodiment. As illustrated in FIG. 10, first display screen data storage 41 stores power conversion data that was output from horizontal period data calculation circuit 46. The power conversion data that was output from horizontal period data calculation circuit 46 is stored in first display screen data storage 41 as the power value of the ith line. When rewriting of the next frame starts, first display screen data storage 41 newly rewrites the power values to be stored, in order from the first line.

Figure 11:
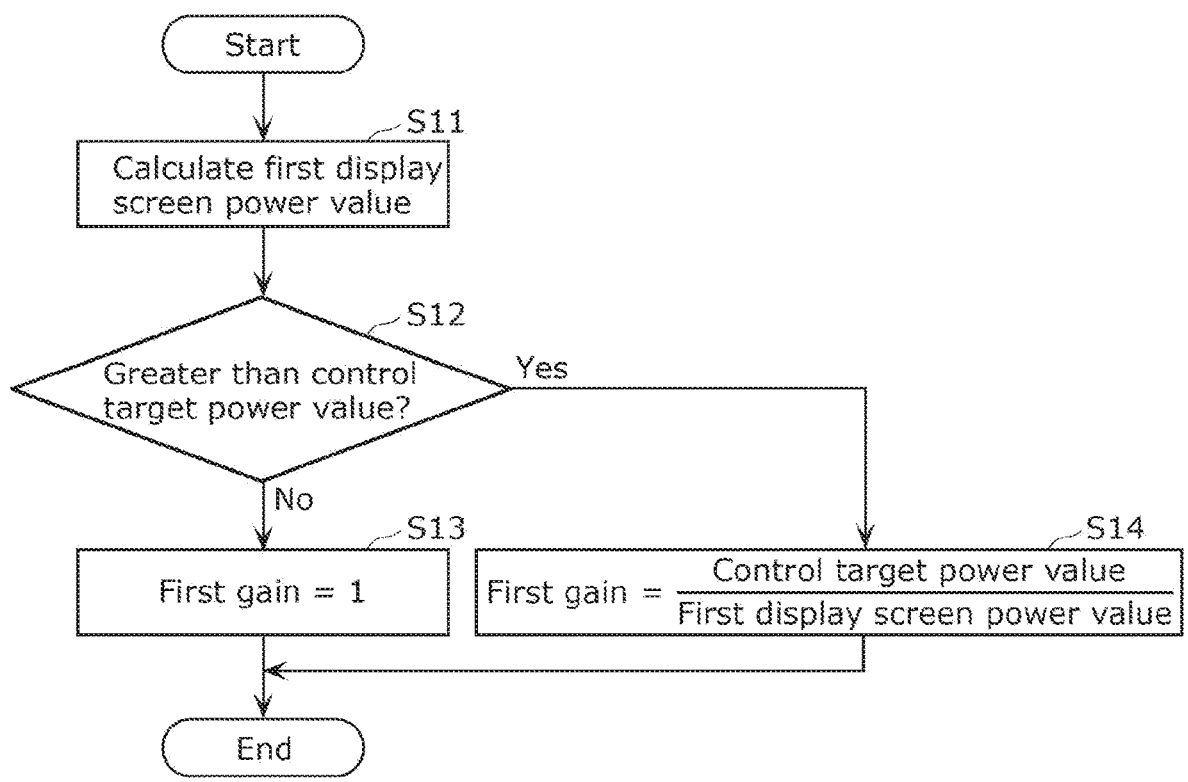
FIG. 11 is a flow chart illustrating a first gain calculation method performed by a first gain calculation circuit according to the embodiment.

Next, a calculation process performed by first gain calculation circuit 51 is described with reference to FIG. 11. FIG. 11 is a flow chart illustrating a first gain calculation method performed by first gain calculation circuit 51 according to the present embodiment.

As illustrated in FIG. 11, first, first gain calculation circuit 51 calculates a first display screen power value based on the horizontal period power conversion data stored in first display screen data storage 41 (S11). Specifically, a sum of horizontal period power conversion data for each of the horizontal lines stored in first display screen data storage 41 is calculated as the first display screen power value. As described above, the first display screen power value is one example of the first power consumption.

Next, first gain calculation circuit 51 determines whether the calculated first display screen power value is greater than a control target power value that is determined in advance (S12). When the first display screen power value is not greater than the control target power value (No in S12), the first gain is set to 1 (S13). When the first display screen power value is greater than the control target power value (Yes in S12), the ratio of the control target power value to the first display screen power value is calculated as the first gain less than 1 (S14).

The first gain is calculated in the above manner.

Returning to FIG. 9, second gain calculation circuit 52 of current limiting circuit 40 calculates a second gain for multiplying the video signal by based on the first power consumption and a rate of change of the first power consumption (S2: calculating of a second gain). The calculating of the second gain (S2) is described below.

Figure 12:
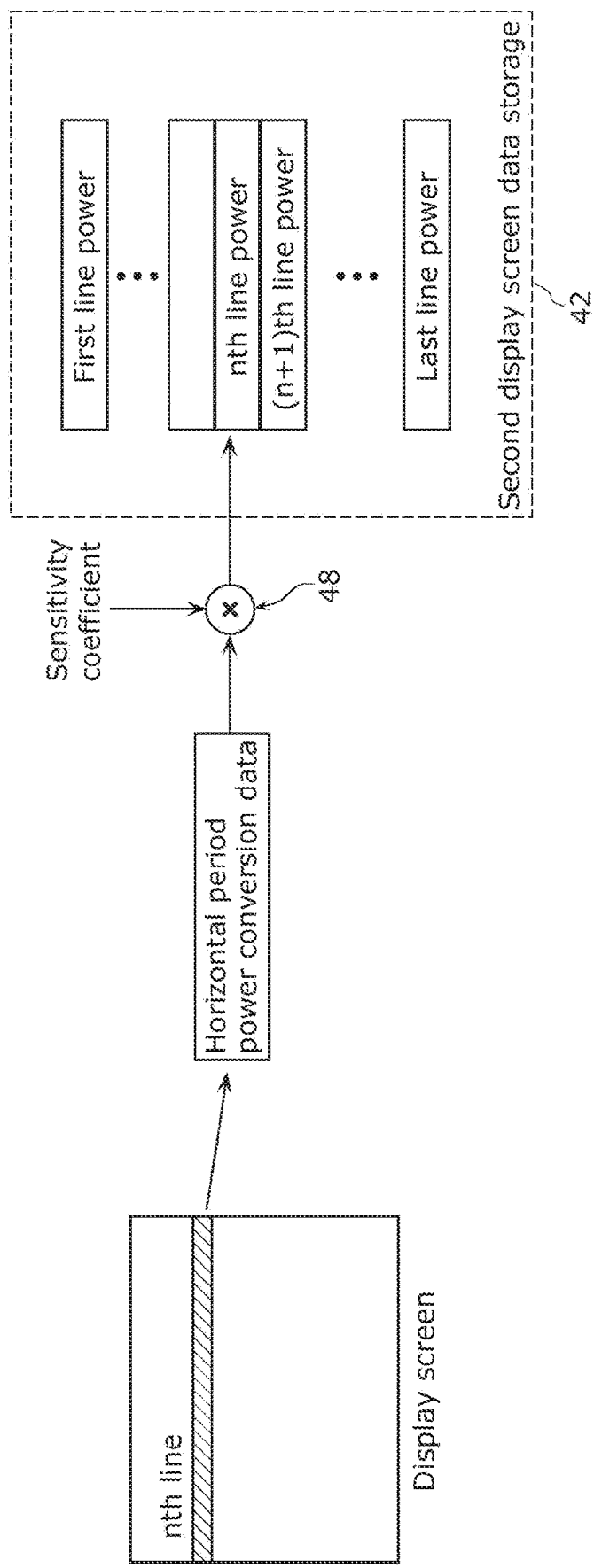
FIG. 12 is a schematic diagram illustrating a configuration of a second display screen data storage according to the embodiment.

Second gain calculation circuit 52 uses converted data for calculating the second gain. The configuration of second display screen data storage 42 that stores the converted data is described with reference to FIG. 12. FIG. 12 is a schematic diagram illustrating the configuration of second display screen data storage 42 according to the present embodiment. As illustrated in FIG. 12, second display screen data storage 42 stores converted data obtained by multiplying power conversion data that was output from horizontal period data calculation circuit 46 by a sensitivity coefficient. The relevant converted data is stored in second display screen data storage 42 as the power value of the ith line. When rewriting of the next frame starts, second display screen data storage 42 newly rewrites the power values to be stored, in order from the first line.

Figure 13:
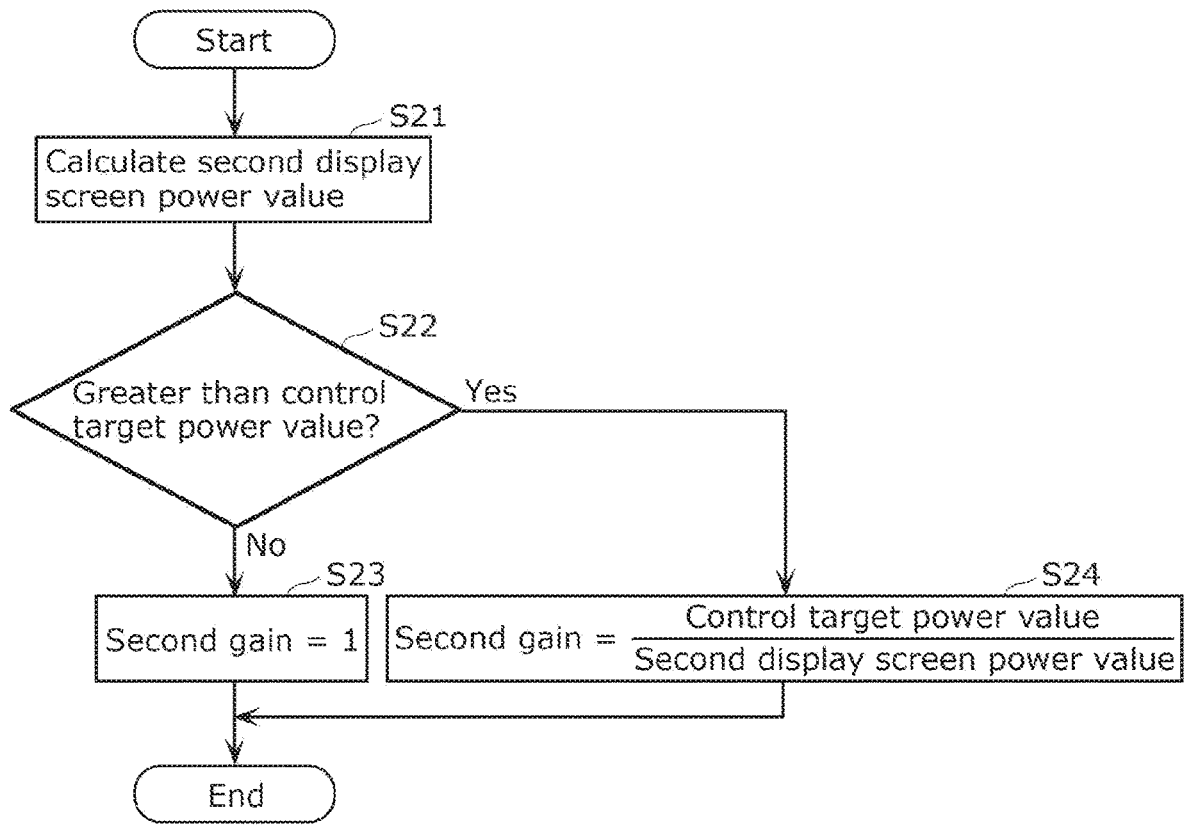
FIG. 13 is a flow chart illustrating a second gain calculation method performed by a second gain calculation circuit according to the embodiment.

Next, a calculation process performed by second gain calculation circuit 52 is described with reference to FIG. 13. FIG. 13 is a flow chart illustrating a second gain calculation method performed by second gain calculation circuit 52 according to the present embodiment.

As illustrated in FIG. 13, first, second gain calculation circuit 52 calculates a second display screen power value based on the converted data stored in second display screen data storage 42 (S21). Specifically, a sum of converted data for each of the horizontal lines stored in second display screen data storage 42 is calculated as the second display screen power value. As described above, the second display screen power value is one example of the second power consumption, and is determined based on the first power consumption and a rate of change of the first power consumption.

Next, second gain calculation circuit 52 determines whether the calculated second display screen power value is greater than a control target power value that is determined in advance (S22). When the second display screen power value is not greater than the control target power value (No in S22), the second gain is set to 1 (S23). When the second display screen power value is greater than the control target power value (Yes in S22), the ratio of the control target power value to the second display screen power value is calculated as the second gain less than 1 (S24).

The second gain is calculated in the above manner.

Returning to FIG. 9, gain selection circuit 55 of current limiting circuit 40 selects one of the first gain and the second gain as a gain by which the video signal is to be multiplied (S3: selecting of a gain). Gain selection circuit 55 selects the first gain as the gain when the first power consumption is decreasing, and selects the second gain as the gain when the first power consumption is increasing.

Next, gain multiplication circuit 44 included in current limiting circuit 40 multiplies the video signal by the gain (S4: multiplying by a gain). Gain multiplication circuit 44 multiplies the received video signal by the gain received from gain selection circuit 55. In the present embodiment, gain multiplication circuit 44 multiplies each of the R signal, G signal, and B signal included in the video signal, by the gain. By gain multiplication circuit 44 multiplying the video signal by the gain, when the display screen power value is greater than the control target power value, a current to be supplied to the pixels included in display panel 60 is limited. As described above, above, with the current limiting method according to the present embodiment, it is possible to limit the current consumption of the pixels included in display panel 60.

3. Advantageous Effects

Next, advantageous effects of display device 10 according to the present embodiment are described in comparison with display devices according to comparative examples. Here, a display device which has the same configuration as display device 10 according to the present embodiment except that the display device does not include a current limiting circuit is used as a display device according to Comparative Example 1. Further, a display device which has the same configuration as display device 10 according to the present embodiment except that the display device includes a current limiting circuit according to the conventional technology is used as a display device according to Comparative Example 2. A current limiting circuit included in the display device according to Comparative Example 2 differs from current limiting circuit 40 according to the present embodiment in the respect that the current limiting circuit of Comparative Example 2 always uses the first gain according to the present embodiment as the gain by which to multiply a video signal.

Figure 14:
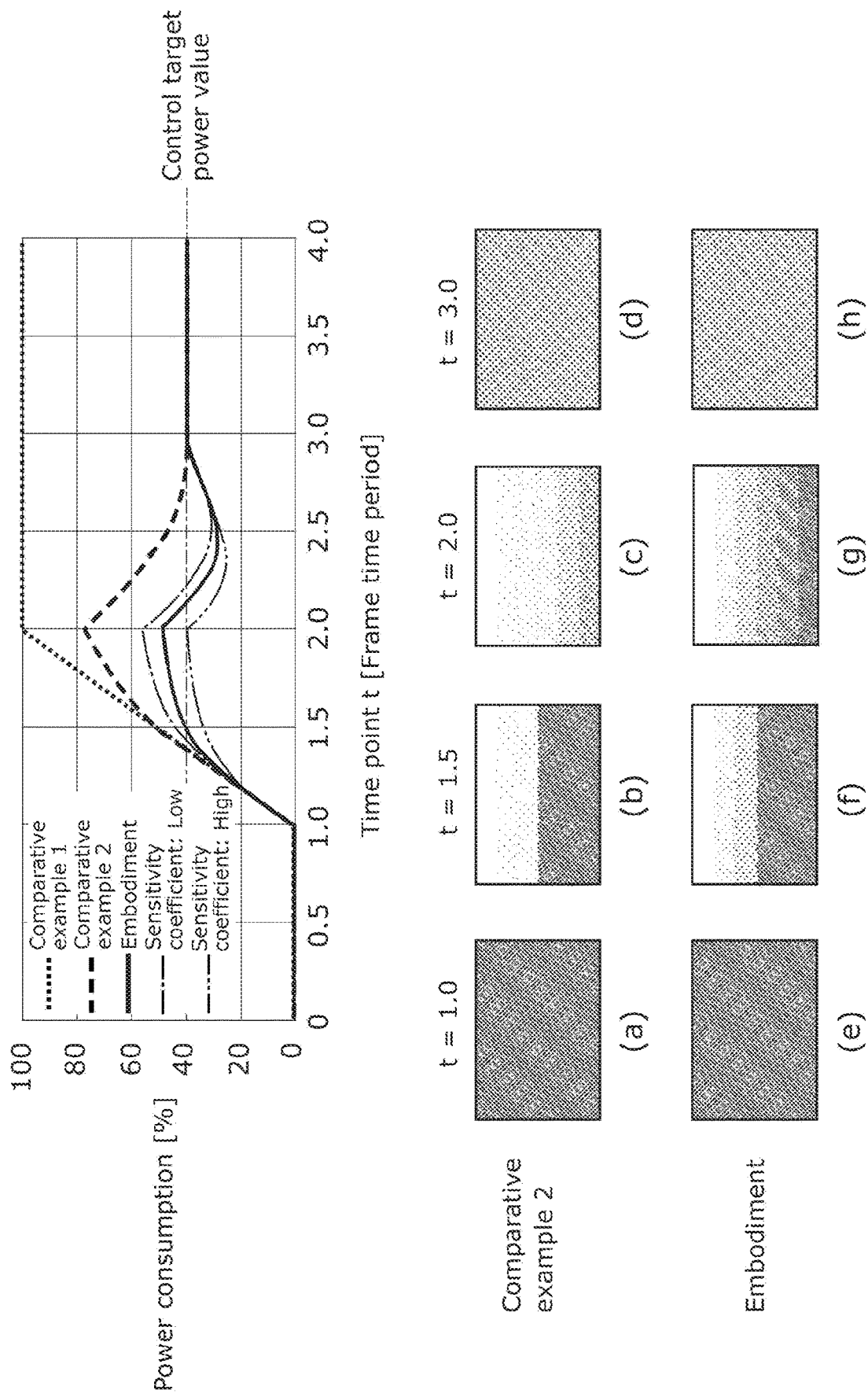
FIG. 14 is a graph illustrating temporal waveforms of power consumption of pixels when all-black display is changed to all-white display in display devices according to Comparative Example 1, Comparative Example 2, and the embodiment.

Next, power consumption of pixels of display unit 70 is described with reference to FIG. 14. FIG. 14 is a graph illustrating temporal waveforms of power consumption of the pixels when all-black display is changed to all-white display in the display devices according to Comparative Example 1, Comparative Example 2, and the present embodiment. In the example illustrated in FIG. 14, after display unit 70 is changed from all-black display to all-white display (that is, an all-pixel white display with maximum luminance), the all-white display is maintained. In FIG. 14, images (a) to (d) displayed at respective time points on display unit 70 according to Comparative Example 2, and images (e) to (h) displayed at the respective time points on display unit 70 according to the present embodiment are shown together.

As illustrated in images (a) and (e) in FIG. 14, at a time point t=1.0 [frame time period] in the graph in FIG. 14, display unit 70 of each display device is in an all-black display state. In this case, a current to be supplied to the pixels in each display unit 70 is approximately zero. Subsequently, when a video signal representing all-white display is input to each display device, switching from black display to white display is performed in order from the top-end line of display unit 70 for each horizontal period of display unit 70. Here, in the display device according to Comparative Example 1, switching to white display is performed in accordance with the video signal input to the display device in all of the lines. That is, the display device according to Comparative Example 1 corresponds to a display device in which a gain that a video signal is to be multiplied by is always 1.

In the display device according to Comparative Example 1, from the time point t=1.0 onward, switching from black display to white display with the maximum luminance is performed in order from the top-end line of display unit 70. Accompanying this, as illustrated in the graph in FIG. 14, the power consumption gradually increases from 0%, and becomes 100% at a time point t=2.0.

In the display device according to Comparative Example 2, when switching from black display to white display is performed in order from the top-end line of display unit 70 from the time point t=1.0 onward, switching to white display with the maximum luminance is performed in accordance with the video signal in the lines near the top end. In this case, as illustrated in the graph in FIG. 14, the power consumption exceeds a control target power value while switching to white display is being performed (see the vicinity of a time point t=1.4 in the graph in FIG. 14). In the example illustrated in FIG. 14, the control target power value is 40% of the power consumption in a case where white display is performed with maximum luminance in the entire display screen. When the power consumption of the pixels exceeds the control target power value in this way, the current limiting circuit according to Comparative Example 2 multiplies the video signal by a gain that is less than 1 (the first gain according to the present embodiment). In this way, the current to be supplied to the pixels is limited.

For example, at a time point t=1.5 in FIG. 14, the lines located in the upper half region of display unit 70 are switched from black display to white display. In the display device according to Comparative Example 2, in this state, as illustrated in image (b) in FIG. 14, the luminance of the video signal is reduced by the current limiting circuit, and thus the luminance of the white display decreases progressively from the top-end line toward the lower lines. Specifically, although the top-end line of display unit 70 represents white display in accordance with the video signal, a line located at the lowermost position among the lines representing white display in image (b) in FIG. 14 (that is, a line located at the middle in the vertical direction of display unit 70) represents white display with a luminance lower than the luminance represented by the video signal (that is, gray display). Thereafter, the pixels disposed in the lines in the lower half of display unit 70 also represent white display with a luminance lower than the luminance represented by the video signal. In the example illustrated in FIG. 14, the gain becomes less than 1 from approximately the time point t=1.4 onward, and the gain becomes 0.4 (=40/100) at the time point t=2.0. In this way, at the time point t=2.0, as illustrated in image (c) in FIG. 14, display unit 70 according to Comparative Example 2 represents all-white display in which the luminance decreases progressively toward the bottom end of display unit 70. At the time point t=2.0, the lines near the top end of display unit 70 represent white display with a luminance in accordance with the video signal, and thus the power consumption of the pixels exceeds the control target power value by a large margin.

The current to be supplied to the pixels is also limited by the current limiting circuit during the one frame time period from the time point t=2.0. In the example illustrated in FIG. 14, the gain is maintained at 0.4. By this means, at a time point t=3.0 after the elapse of one vertical period from the time point t=2.0, all lines represent all-white display with a luminance lower than the luminance represented by the video signal. In this way, power consumption of the pixels from the time point t=3.0 onward is limited to the control target power value or less.

As described above, in the display device according to Comparative Example 2, the power consumption of the pixels may temporarily exceed the control target power value by a large margin.

On the other hand, as illustrated in image (e) in FIG. 14, display unit 70 of display device 10 according to the present embodiment is in an all-black display state at the time point t=1.0 in the graph in FIG. 14. When a video signal for one frame to be input to display panel 60 represents all-black display, display unit 70 becomes an all-black display. When a video signal for one frame that directly follows the video signal for one frame representing all-black display is a video signal representing all-white display, from the time point t=1.0 onward, the first power consumption increases. Therefore gain selection circuit 55 selects the second gain as the gain. The second display screen power value that is used when calculating the second gain is, as described above, calculated using a value obtained by multiplying the horizontal period power conversion data by the sensitivity coefficient. When the first power consumption is increasing, the sensitivity coefficient becomes greater than 1 (see the above Expression (1)), and therefore the second display screen power value becomes greater than the first display screen power value that is calculated using the horizontal period power conversion data itself. Accordingly, when the first power consumption is increasing, the second gain is less than the first gain. Further, the second gain becomes less than 1 before the first display screen power value exceeds the control target power value. As illustrated in image (f) in FIG. 14, the luminance of the video signal is reduced by current limiting circuit 40, and therefore, similarly to image (b), the luminance of the white display decreases progressively from the top-end line toward the lower lines. Specifically, although the top-end line of display unit 70 represents white display in accordance with the video signal, a line disposed at the lowermost position among the lines representing white display in image (b) in FIG. 14 (that is, a line located at the middle in the vertical direction of display unit 70) represents white display with a luminance which is lower than the luminance represented by the video signal and is also lower than the luminance in display unit 70 according to Comparative Example 2 illustrated in image (b). Thereafter, the pixels disposed in the lines in the lower half of display unit 70 also represent white display with a luminance which is lower than the luminance represented by the video signal and is also lower than the luminance in display unit 70 according to Comparative Example 2. In this way, at the time point t=2.0, as illustrated in image (g) in FIG. 14, display unit 70 according to the present embodiment represents all-white display in which the luminance decreases progressively toward the bottom end of display unit 70.

At the time point t=2.0, the lines near the top end of display unit 70 represent white display with a luminance in accordance with the video signal, and thus the power consumption of the pixels slightly exceeds the control target power value. However, the second gain is less than the gain according to Comparative Example 2. For example, at the time point t=2.0, the second gain is less than the gain (0.4) according to the comparative example. Therefore, the power consumption of the pixels according to the present embodiment is reduced more than the power consumption of the pixels according to Comparative Example 2.

From the time point t=2.0 onward, switching from black display to white display is completed, and the first power consumption becomes constant. Therefore, from the time point t=2.0 onward, because the sensitivity coefficient is 1, the second gain is equal to the first gain. For this reason, from the time point t=2.0 onward, the power consumption of the pixels decreases in display device 10 according to the present embodiment also, similarly to the display device according to Comparative Example 2. However, in the present embodiment, at lines near the bottom end of display unit 70, the luminance is lower than in lines near the bottom end of display unit 70 according to Comparative Example 2, and consequently the power consumption of the pixels according to the present embodiment is temporarily less than the control target power value. Subsequently, by the lines near the bottom end of display unit 70 being switched to white display in which the luminance is comparatively high similarly to Comparative Example 2, the power consumption of the pixels according to the present embodiment increases, and becomes the control target power value at the time point t=3.0. From the time point t=3.0 onward, power consumption of the pixels is limited to the control target power value or less.

As described above, according to current limiting circuit 40 and the current limiting method of the present embodiment, by using a second gain that is calculated based on the first power consumption and a rate of change of the first power consumption, it is possible to reduce the power consumption of display panel 60 even when the luminance represented by a video signal abruptly increases.

Further, in display device 10 according to the present embodiment, it is possible to adjust the power consumption (and current consumption) of the pixels by adjusting the sensitivity coefficient. For example, as illustrated by a chain line in the graph in FIG. 14, if the sensitivity coefficient is decreased by decreasing sensitivity level Iv shown in the aforementioned Expression (1), the influence of the sensitivity coefficient can be reduced. That is, the current limiting characteristics of current limiting circuit 40 according to the present embodiment can be brought close to the current limiting characteristics of the current limiting circuit according to Comparative Example 2. Further, as illustrated by a chain double-dashed line in the graph in FIG. 14, if the sensitivity coefficient is increased by increasing sensitivity level Iv shown in the aforementioned Expression (1), the influence of the sensitivity coefficient can be increased. That is, the current can be limited even more.

Other Embodiments

Although the present disclosure has been described above based on the exemplary embodiment, the present disclosure is not limited to such an embodiment. The present disclosure also encompasses: other embodiments implemented by combining arbitrary constituent elements in the embodiment; variations obtained by making various modifications conceivable to those skilled in the art, to the embodiment within the scope of the present disclosure; and various apparatuses that include, for example, the current limiting circuit according to the present embodiment.

Figure 15:
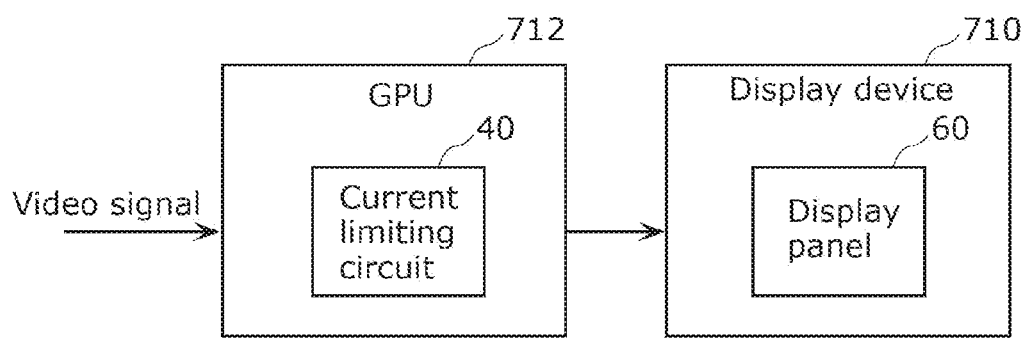
FIG. 15 is a block diagram illustrating a relationship between a current limiting circuit and a display device according to a variation.
Figure 16:
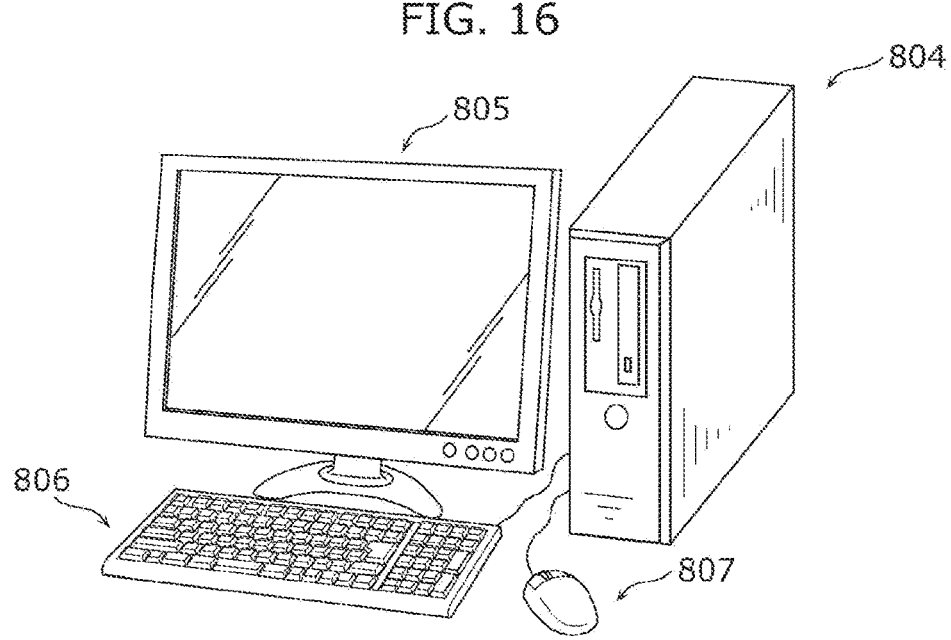
FIG. 16 is an external view of a personal computer (PC) which includes the current limiting circuit according to the variation.
Figure 17:
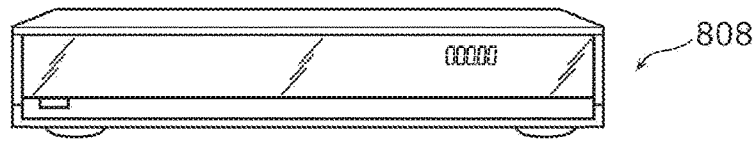
FIG. 17 is an external view of a hard disk recorder which includes the current limiting circuit according to the variation.

For example, in the above embodiment, current limiting circuit 40 is included in display device 10, but current limiting circuit 40 need not necessarily be included in display device 10. Such a variation is described with reference to FIG. 15. FIG. 15 is a block diagram illustrating a relationship between current limiting circuit 40 and display device 710 according to the present variation. As illustrated in FIG. 15, current limiting circuit 40 is included in graphics processing unit (GPU) 712. GPU 712 is a calculation device for image processing, receives a video signal, and outputs a video signal obtained through multiplication by a gain by current limiting circuit 40. GPU 712 is disposed outside display device 710. GPU 712 may be included in, for example, personal computer (PC) 804 as illustrated in FIG. 16. PC 804 is operated using keyboard 806 and mouse 807, for example. Display device 710 may be included in monitor 805 illustrated in FIG. 15. Monitor 805 includes display device 710, and displays a video signal received from PC 804. GPU 712 may be included in hard-disk recorder 808 as illustrated in FIG. 17.

Even when current limiting circuit 40 according to the above embodiment is not included in display device 10 as described above, the same advantageous effects as those provided by current limiting circuit 40 according to the above embodiment are provided.

Figure 18:
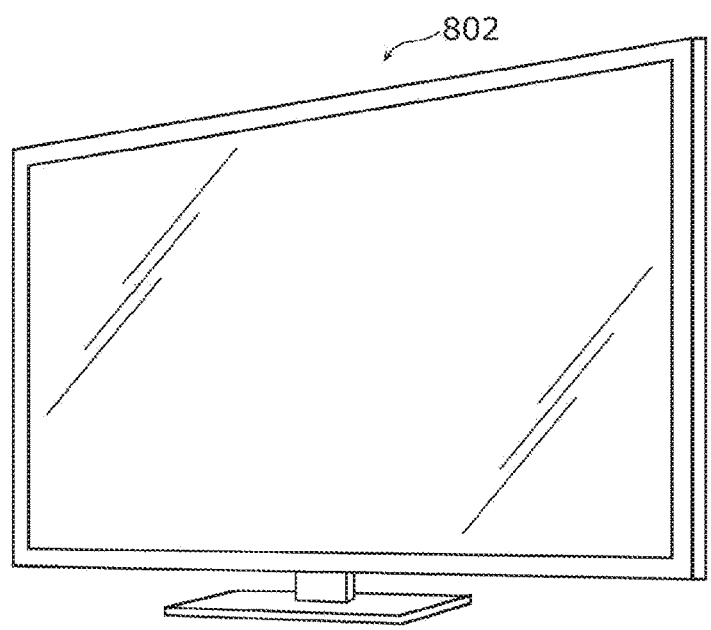
FIG. 18 is an external view of a thin flat television set (TV) which includes the display device according to the embodiment.

Also, display device 10 according to the above embodiment may be included in thin flat TV 802 as illustrated in FIG. 18. Even in this case, the same advantageous effects as those provided by the above embodiment are provided.

The configuration described in the above embodiment is the configuration in which each of the pixels of the display panel includes three sub-pixels corresponding to three colors of R, G, and B. The pixel configuration, however, is not limited to this. For example, each pixel may include four sub-pixels corresponding to four colors of R, G, B, and W. When the display panel is a monochrome display panel, each pixel may include a single circuit illustrated in FIG. 6.

In the above embodiment, the video signal includes an R signal, a G signal, and a B signal; however, the video signal may include a signal other than an R signal, a G signal, and a B signal. That is to say, it is sufficient so long as the video signal includes an R signal, a G signal, and a B signal.

The video signal is not limited to a signal including an R signal, a G signal, and a B signal. For example, the video signal may be a chrominance signal including a luminance signal.

Also, in the above embodiment, organic EL elements are used as self luminous elements; however, the self luminous elements are not limited to this example. For example, inorganic EL elements or the like may be used as the self luminous elements.

Also, part of the constituent elements of current limiting circuit 40 according to the above embodiment may be a computer system including, for example, a microprocessor, read-only memory (ROM), random-access memory (RAM), a hard disk unit, a display unit, a keyboard, and a mouse. A computer program is recorded on the RAM or the hard disk unit. Functions are achieved as a result of the microprocessor operating according to the computer program. Here, the computer program is configured by combining a plurality of instruction codes indicating instructions for the computer in order to achieve given functions.

Also, part of the constituent elements of current limiting circuit 40 according to the above embodiment may be configured from one system large-scale integration (LSI) circuit. A system LSI circuit is a super-multifunction LSI circuit manufactured with a plurality of components integrated on a single chip, and is specifically a computer system including a microprocessor, ROM, and RAM, for example. A computer program is stored in the RAM. The system LSI achieves its function as a result of the microprocessor operating according to the computer program.

Also, part of the constituent elements of current limiting circuit 40 according to the above embodiment may be configured as an integrated circuit (IC) card that is detachably attached to each device, or as a stand-alone module. The IC card and the module are computer systems including a microprocessor, ROM, and RAM, for example. The IC card and the module may include the super-multifunction LSI circuit described above. The IC card and the module achieve their functions as a result of the microprocessor operating according to a computer program. The IC card and the module may be tamperproof.

Further, part of the constituent elements of current limiting circuit 40 according to the above embodiment may also be implemented as the computer program or the digital signal recorded on a computer-readable recording medium such as a flexible disk, hard disk, compact-disc ROM (CD-ROM), magneto-optical (MO) disc, digital versatile disc (DVD), DVD-ROM, DVD-RAM, a Blu-ray (registered trademark) Disc (BD), or a semiconductor memory, for example. Furthermore, it may be implemented as the digital signal recorded on these recording media.

Also, part of the constituent elements of current limiting circuit 40 according to the above embodiment may also be implemented by transmitting the computer program or the digital signal via, for example, an electric communication line, a wireless or wired communication line, a network such as the Internet, or data broadcasting.

The present disclosure may be implemented as the methods described above. The present disclosure may be a computer program that implements these methods using a computer, or a digital signal that includes the computer program. In addition, the present disclosure may be implemented as a non-transitory computer-readable recording medium such as CD-ROM having the computer program recorded thereon.

Also, the present disclosure may be implemented as a computer system including (i) memory having the computer program stored therein, and (ii) a microprocessor that operates according to the computer program.

Also, the computer program or the digital signal may be implemented by an independent computer system by being recorded on the recording medium and transmitted, or by being transmitted via the network, for example.

The above embodiment and variations may be combined.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is useful for, for example, organic EL flat panel displays, and is particularly suitable for use in large-screen displays with high power consumption.

The invention claimed is:

1. A current limiting circuit that receives a video signal for a display panel including pixels, and limits current consumption of the pixels, the current limiting circuit comprising:
a first gain calculation circuit that calculates a first gain for multiplying with the video signal, based on first power consumption that is power consumption of the pixels corresponding to the video signal;
a second gain calculation circuit that calculates a second gain for multiplying with the video signal, based on the first power consumption and a rate of change of the first power consumption;
a gain selection circuit that selects one of the first gain and the second gain as a gain by which the video signal is to be multiplied; and
a gain multiplication circuit that multiplies the video signal by the gain.

2. The current limiting circuit according to claim 1, wherein the gain selection circuit selects the first gain as the gain when the first power consumption is decreasing, and selects the second gain as the gain when the first power consumption is increasing.

3. The current limiting circuit according to claim 2, wherein the gain selection circuit selects, as the gain, a most recently selected one of the first gain and the second gain, when the first power consumption has not changed.

4. The current limiting circuit according to claim 2, wherein the gain selection circuit selects the first gain as the gain when a change over time of the first power consumption cannot be determined.

5. The current limiting circuit according to claim 1, wherein the first gain calculation circuit calculates a first display screen power value that is a prediction value of power consumption of the pixels corresponding to the video signal for one frame, and
the first gain is less than 1 when the first display screen power value is greater than a control target power value, the control target power value being a control target upper limit of power consumption of the pixels.

6. The current limiting circuit according to claim 5, wherein, when the first display screen power value is greater than the control target power value, the first gain is less than or equal to a value obtained by dividing the control target power value by the first display screen power value.

7. The current limiting circuit according to claim 1, wherein the second gain calculation circuit calculates the second gain based on second power consumption that is power consumption of the pixels corresponding to a value obtained by multiplying the video signal by a sensitivity coefficient, and
the sensitivity coefficient is a coefficient that increases with an increase in the rate of change of the first power consumption.

8. The current limiting circuit according to claim 7, wherein the second gain calculation circuit calculates a second display screen power value that is a prediction value of power consumption of the pixels corresponding to a value obtained by multiplying the video signal for one frame by the sensitivity coefficient, and
the second gain is less than 1 when the second display screen power value is greater than a control target power value, the control target power value being a control target upper limit of power consumption of the pixels.

9. The current limiting circuit according to claim 8, wherein, when the second display screen power value is greater than the control target power value, the second gain is less than or equal to a value obtained by dividing the control target power value by the second display screen power value.

10. The current limiting circuit according to claim 1, wherein the first gain calculation circuit and the second gain calculation circuit calculate and output the first gain and the second gain, respectively, for each period shorter than a vertical period of the video signal.

11. The current limiting circuit according to claim 1, wherein the video signal includes a red (R) signal, a green (G) signal, and a blue (B) signal.

12. A display device comprising:
the current limiting circuit according to claim 1; and
the display panel.

13. A current limiting method for limiting current consumption of pixels included in a display panel, the current limiting method comprising:
calculating a first gain for multiplying with a video signal for the display panel, based on first power consumption that is power consumption of the pixels corresponding to the video signal;
calculating a second gain for multiplying with the video signal, based on the first power consumption and a rate of change of the first power consumption;
selecting one of the first gain and the second gain as a gain by which the video signal is to be multiplied; and
multiplying the video signal by the gain.

* * * * *